(12) United States Patent
Herod

(10) Patent No.: US 6,485,766 B2
(45) Date of Patent: Nov. 26, 2002

(54) COFFEE FILTER PACK APPARATUS AND METHOD

(76) Inventor: Walter Herod, 1159 Deltona Blvd., Deltona, FL (US) 32725

( * ) Notice: Subject to any disclaimer, the term of this patent is extended or adjusted under 35 U.S.C. 154(b) by 0 days.

(21) Appl. No.: 09/862,908

(22) Filed: May 22, 2001

(65) Prior Publication Data

US 2001/0053399 A1 Dec. 20, 2001

Related U.S. Application Data

(60) Provisional application No. 60/208,031, filed on May 31, 2000.

(51) Int. Cl.$^7$ .............................................. B65B 29/02
(52) U.S. Cl. ............................ 426/78; 426/79; 426/87; 426/383; 426/394; 53/411; 53/474
(58) Field of Search ............................ 426/77–84, 112, 426/433, 435, 87, 383, 394; 99/295; 53/411, 474

(56) References Cited

U.S. PATENT DOCUMENTS

| | | | | | |
|---|---|---|---|---|---|
| 2,791,505 A | * | 5/1957 | Barnett | ........................ | 426/79 |
| 3,053,665 A | * | 9/1962 | Irmscher | ...................... | 426/79 |
| 3,083,100 A | * | 3/1963 | Baran | ........................... | 426/77 |
| 3,208,854 A | * | 9/1965 | Hediger et al. | ................ | 426/77 |
| 3,373,677 A | * | 3/1968 | Petrozzo | ....................... | 426/77 |
| 3,420,675 A | * | 1/1969 | Costas | .......................... | 426/77 |
| 3,445,237 A | * | 5/1969 | Gidge | ........................... | 426/77 |
| 3,846,569 A | * | 11/1974 | Kaplan | ......................... | 426/77 |
| 5,895,672 A | * | 4/1999 | Cooper | ......................... | 426/79 |

FOREIGN PATENT DOCUMENTS

| | | | | |
|---|---|---|---|---|
| BE | 776328 | * 12/1971 | ................... | 426/79 |
| FR | 2205045 | * 5/1974 | ................... | 426/79 |
| GB | 24151 | * 12/1904 | ................... | 426/79 |

* cited by examiner

*Primary Examiner*—Steve Weinstein
(74) *Attorney, Agent, or Firm*—William M. Hobby, III

(57) ABSTRACT

A coffee filter pack apparatus has a coffee filter bag formed with a plurality of coffee filter sheets attached together to form a plurality of enclosed spaced therein, each enclosed spaced having a plurality of measured amounts of predetermined ground coffee. One of the coffee filter sheets has indicia thereon to indicate the direction of flow of heated water through the coffee bag during brewing of the coffee. A method of making a coffee filter bag includes the steps of selecting predetermined amounts of first and second ground coffee, closing each into attached first and second coffee filter bags, and labeling the combined coffee filter bags to indicate the direction of flow of heated water therethrough.

7 Claims, 1 Drawing Sheet

COFFEE FILTER PACK APPARATUS AND METHOD

This application is related to and claims priority from U.S. Provisional Application Ser. No. 60/208,031, filed May 31, 2000.

BACKGROUND OF THE INVENTION

The present invention relates to a coffee filter pack and especially to a coffee filter pack designed to improve the taste of coffee made in an auto-drip coffee maker.

In the past, it has been common to provide both coffee and tea leaves in filter bags. In the case of tea leaves, the bags are typically provided with a string with a predetermined amount of tea leaves in a filter bag which is then dangled in a cup of hot water for making hot tea. In the case of coffee, filter bags are typically a pancake-shaped disc made of two coffee filters enclosing a predetermined amount of ground coffee therebetween which can be placed in an auto-drip coffee maker. The heated water is dripped onto the coffee filter pack and into a coffee pot. This type of filter pack has the advantage of having the ground coffee premeasured and avoids having to place a separate filter within an auto drip coffee maker. It also allows for easy cleanup since the ground coffee remains stay within the filter pack so that the filter pack can be easily removed and thrown away. Coffee filter packs are typically made in an amount so that one, two, or three coffee filter bags can be placed within the auto drip coffee maker for making the coffee stronger or weaker as desired.

The coffee filter pack of the present invention includes dual coffee filter packs with different amounts and different types of coffee within each divided filter pack section. The coffee pack identifies the top from the bottom of the pack to allow the coffee to filter in one direction of travel to produce the desired result.

SUMMARY OF THE INVENTION

A coffee filter pack apparatus has a coffee filter bag formed with a plurality of coffee filter sheets attached together to form a plurality of enclosed spaced therein, each enclosed spaced having a plurality of measured amounts of predetermined ground coffee. One of the coffee filter sheets has indicia thereon to indicate the direction of flow of heated water through the coffee bag during brewing of the coffee. A method of making a coffee filter bag includes the steps of selecting predetermined amounts of first and second ground coffee, closing each into attached first and second coffee filter bags, and labeling the combined coffee filter bags to indicate the direction of flow of heated water therethrough.

BRIEF DESCRIPTION OF THE DRAWINGS

Other objects, features, and advantages of the present invention will be apparent from the written description and the drawings in which.

DESCRIPTION OF THE PREFERRED EMBODIMENTS

Figure 1:
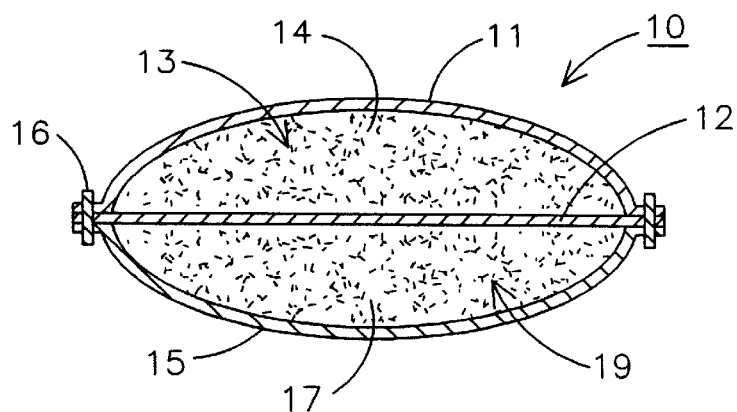
FIG. 1 is a side sectional view of a filtered coffee bag in accordance with the present invention.
Figure 2:
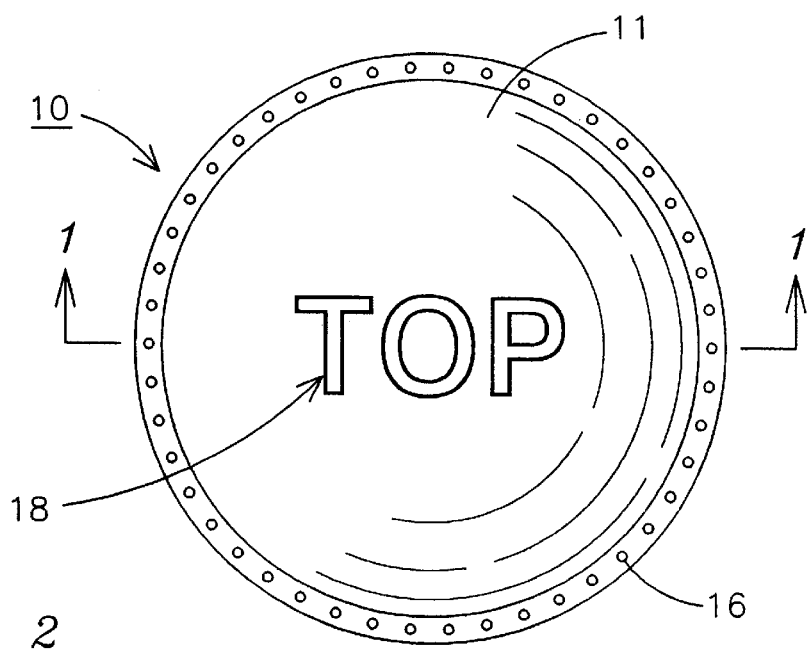
FIG. 2 is a top plan view of a filtered coffee bag of FIG. 1.

Referring to the drawings, FIG. 1 is a sectional view of a filtered coffee bag 10 having a top filter 11 and a center filter 12 forming a ground coffee holding area 13 filled with a predetermined ground coffee 14. A second filter 15 is placed below the filter 12 and the filters 11, 12 and 15 are attached together with attachment 16. The filter can be threadedly sewn together or adhesively attached as desired. The filter 15 forms an area 19 between the filters 15 and 12 and is filled with a predetermined ground coffee 17. The coffee 14 is a low acid helper coffee placed in the top filtered section while the coffee 17 in the lower coffee area is a more highly flavored coffee, such as a Columbian coffee, having a specific desired taste. In one preferred embodiment for a six cup filter pack, the top filter area 13 can be filled with two tablespoons of a helper coffee while the bottom area 19 can have three tablespoons of a more flavorful coffee 17. As seen in FIG. 2, the top filter 11 has indicia 18 thereon, such as spelling the word "top", so as to distinguish the top from the bottom filter area to ensure that the heated water passes through the coffee filter pack in the right direction.

Figure 3:
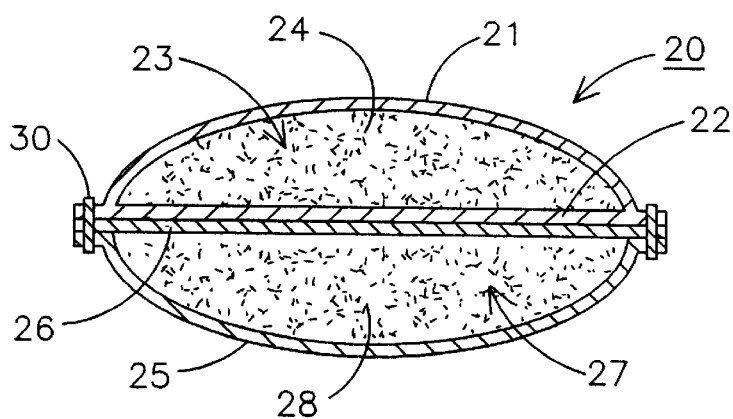
FIG. 3 is a side sectional view of a second embodiment of a filtered coffee bag in accordance with the present invention.

FIG. 3 shows an alternate embodiment in which the coffee filter pack 20 has a top filter 21 and a bottom filter 22 forming a coffee holding area 23 filled with ground coffee 24. A bottom filter 25 is attached to an intermediate filter 26 to form the coffee holding area 27 filled with the coffee 28. Thus, two filter packs are formed which are attached with the attachment means 30 which can be threadedly attached or adhesively attached as desired. It will be clear that the top filter 21 will have indicia, such as shown in FIG. 2. The bottom filter 25 may also be identified with the word "bottom" or some other indicia. I have found that the improved taste of the coffee depends upon the hot water passing in the right direction between the two filtered coffees. The use of two different types of ground coffee, one a helper coffee low acid and one a highly flavored coffee produces an improved cup of coffee without any increase in the amount of coffee used to make a pot of coffee. In addition, the cost is reduced by the use of a less expensive coffee as a helper coffee in combination with the more flavorable coffee.

It should be clear at this time that a convenient coffee filter pack has been provided which advantageously improves the taste of the coffee while providing coffee in a convenient filter pack for use in auto drip coffee makers.

I claim:

1. A method of making a coffee filter pack comprising the steps of:

selecting a predetermined amount of a first low acid ground coffee;

selecting a predetermined amount of a second highly flavored ground coffee;

enclosing said selected first ground coffee into a first coffee filter bag;

enclosing said selected second ground coffee into a second coffee filter bag attached to said first filter bag; and labeling said attached filter bags to indicate how to position the bags so that the direction of flow of heated water therethrough should first pass through the coffee filter bag containing said low acid ground coffee for improving the taste of brewed coffee by passing heated water in the indicated direction of flow through the two separated coffees in the filter pack.

2. A method of making a coffee filter pack in accordance with claim 1 in which said selected first and second ground coffees are enclosed in first and second coffee bags having a common filter wall separating said first and second ground coffees.

3. A method of making a coffee filter pack in accordance with claim 2 in which said labeling includes printing on one said filter bag wall.

4. A method of making a coffee filter pack in accordance with claim 1 in which the step of enclosing said first and second ground coffees includes enclosing said first and second coffees in a dual coffee filter bag having three sheets of filter material having one filter sheet separating said first and second ground coffees.

5. A coffee filter pack comprising:

a multiple compartment, single coffee filter bag formed with a plurality of coffee filter sheets attached together to form a plurality of enclosed spaces therein;

a plurality of measured amounts of predetermined ground coffee filling each enclosed space in said single coffee bag wherein a low acid ground coffee is contained in a first enclosed space and a highly flavored ground coffee is contained in a second enclosed space; and at least one said coffee filter sheet having indicia thereon indicating how to position the bag so that the direction of flow of heated water through said coffee bag has to first pass through said first enclosed space containing said low acid ground coffee;

whereby the multiple compartment coffee bag separates the plurality of coffees during brewing of coffee.

6. A coffee filter pack in accordance with claim 5 in which said coffee filter bag plurality of coffee filter sheets are sewn together.

7. A coffee filter pack in accordance with claim 5 in which said coffee filter bag plurality of coffee filter sheets are attached with an adhesive.

* * * * *